(12) United States Patent
Gulen et al.

(10) Patent No.: US 8,171,718 B2
(45) Date of Patent: May 8, 2012

(54) METHODS AND SYSTEMS INVOLVING CARBON SEQUESTRATION AND ENGINES

(75) Inventors: Seyfettin Can Gulen, Niskayuna, NY (US); Cristina Botero, Cambridge, MA (US)

(73) Assignee: General Electric Company, Schenectady, NY (US)

( * ) Notice: Subject to any disclaimer, the term of this patent is extended or adjusted under 35 U.S.C. 154(b) by 296 days.

(21) Appl. No.: 12/573,334

(22) Filed: Oct. 5, 2009

(65) Prior Publication Data

US 2011/0079017 A1    Apr. 7, 2011

(51) Int. Cl.
*F02C 7/08* (2006.01)
(52) U.S. Cl. .................. 60/39.52; 60/806
(58) Field of Classification Search ........ 60/39.182, 60/39.5, 39.52, 783, 784, 806; 123/568.11–568.15
See application file for complete search history.

(56) References Cited

U.S. PATENT DOCUMENTS

| | | | |
|---|---|---|---|
| 5,555,721 A * | 9/1996 | Bourneuf et al. | 60/806 |
| 5,577,377 A | 11/1996 | Tomlinson | |
| 5,611,197 A | 3/1997 | Bunker | |
| 5,724,805 A * | 3/1998 | Golomb et al. | 60/783 |
| RE36,497 E | 1/2000 | Tomlinson | |
| 6,339,926 B1 | 1/2002 | Ichiro et al. | |
| 6,672,075 B1 | 1/2004 | Sandu et al. | |
| 6,860,109 B2 * | 3/2005 | Tsuji | 60/806 |
| 7,966,829 B2 * | 6/2011 | Finkenrath et al. | 60/772 |
| 2007/0234729 A1 * | 10/2007 | West et al. | 60/772 |
| 2009/0061264 A1 * | 3/2009 | Agnew | 429/14 |
| 2011/0232298 A1 * | 9/2011 | Mahendra et al. | 60/783 |

* cited by examiner

*Primary Examiner* — Louis Casaregola
*Assistant Examiner* — Phutthiwat Wongwian
(74) *Attorney, Agent, or Firm* — Cantor Colburn LLP

(57) ABSTRACT

A system for power generation comprises an engine operative to output an exhaust gas, a carbon capture means operative to remove carbon dioxide ($CO_2$) from the exhaust gas and output the $CO_2$, and a compressor operative to receive the $CO_2$ and output compressed $CO_2$ that cools a component of the engine.

18 Claims, 3 Drawing Sheets

METHODS AND SYSTEMS INVOLVING CARBON SEQUESTRATION AND ENGINES

BACKGROUND OF THE INVENTION

The subject matter disclosed herein relates to carbon sequestration and more specifically to sequestering carbon in power systems.

Power systems often emit carbon dioxide exhaust gases. Carbon sequestration systems remove the carbon dioxide gas from the exhaust gases and store the carbon dioxide.

The removal of the carbon dioxide gas from the exhaust gases consumes energy that otherwise would be utilized for generation of useful shaft power. A method and system that allows a system to sequester carbon and operate more efficiently is desired.

BRIEF DESCRIPTION OF THE INVENTION

According to one aspect of the invention, a system for power generation comprises, an engine operative to output an exhaust gas, a carbon capture means operative to remove carbon dioxide (CO2) from the exhaust gas and output the CO2, and a compressor operative to receive the CO2 and output compressed CO2 that cools a component of the engine.

According to another aspect of the invention, a method for operating a power system including outputting exhaust gas from an engine, removing carbon dioxide (CO2) from the exhaust gas, compressing the CO2, and cooling a component of the engine with the compressed CO2.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Carbon capture means and sequestration (CCS) is used to remove CO2 from system exhaust gases and store the CO2 in a sequestration location. CCS methods often consume energy, resulting in a loss of system efficiency; for example, post-combustion amine-based removal of CO2 uses energy for solvent regeneration e.g., thermal energy from a heat recovery steam generator or steam turbine extraction, and power used to drive a compressor that compresses the CO2 for sequestration. Gas turbine engines often use pre-combustion compressed air (bleed air) to cool engine components. The use of the bleed air reduces the performance, i.e., output and thermal efficiency, of the gas turbine engine.

Figure 1:
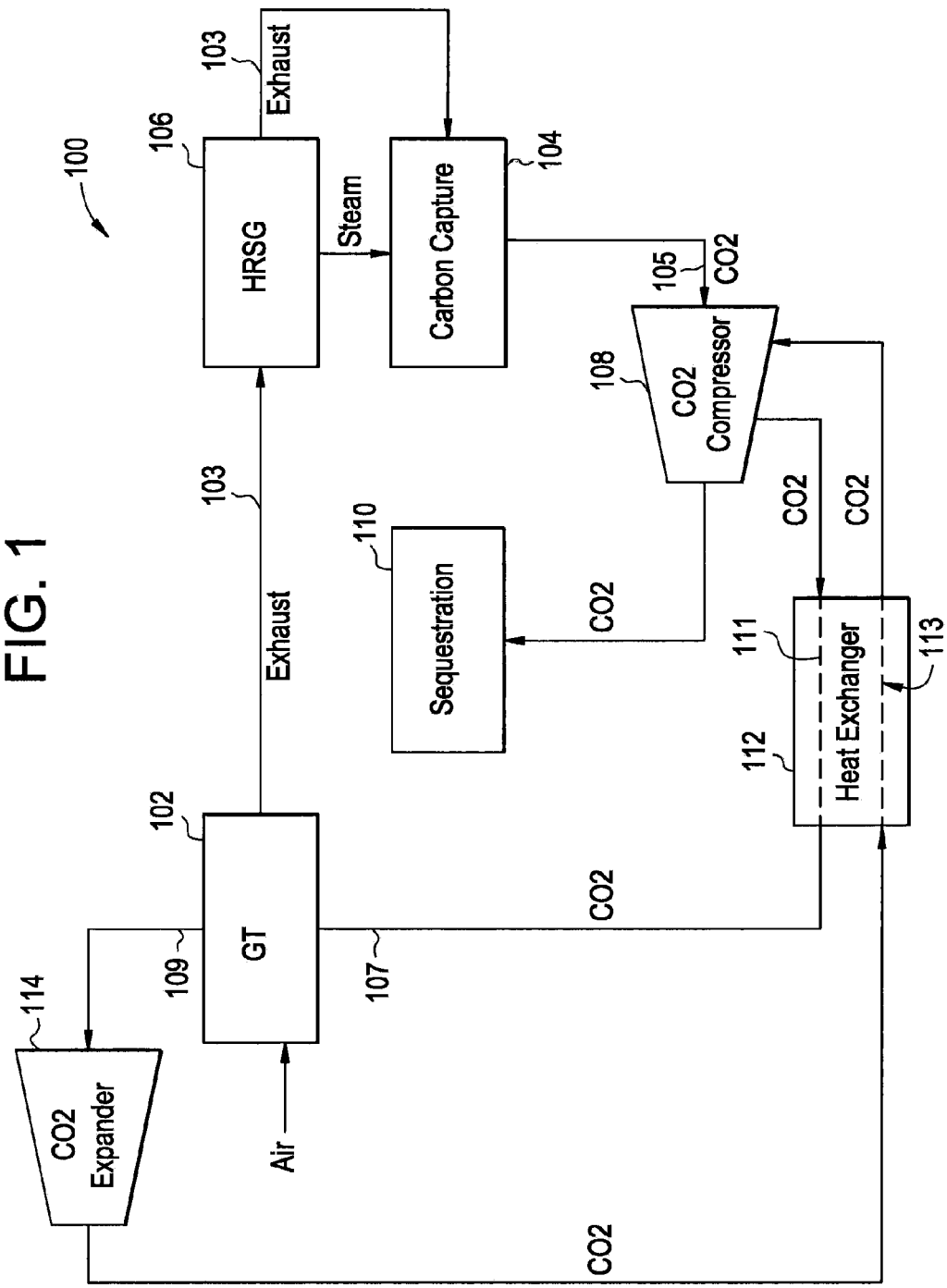
FIG. 1 illustrates an exemplary system and method for power generation.

FIG. 1 illustrates an exemplary system and method for increasing the efficiency of a power system that uses CCS. In this regard, the system 100 includes a gas turbine engine 102 that outputs post-combustion exhaust gas 103 to a carbon capture means 104 via a heat recovery steam generator (HRSG) 106. The illustrated exemplary embodiment includes the HRSG 106 that cools the exhaust gas 103 and outputs steam, however other embodiments may not include the HRSG 106. The carbon capture means 104 in the illustrated exemplary embodiment may be, for example, an amine-based system that may, for example, receive steam from the HRSG 106; however, any other suitable carbon capture means method or system may be used to extract CO2 from the exhaust 103. The carbon capture means 104 removes CO2 from the exhaust gas 103. The CO2 at 105 is compressed by a compressor 108, and is routed to the sequestration location 110. The sequestration location 110 may include, for example, an underground storage site that may be, for example, several hundred feet or several hundred miles away from the power plant. A portion of the compressed CO2 is extracted from a port in the CO2 compressor at a pressure suitable for delivery to and return from the gas turbine via an adequately designed piping system. The extracted CO2 is routed through a heat exchanger 112 (via a first fluid path 111) where it is heated to a temperature suitable for cooling the gas turbine 102 (e.g., 600° F.) by CO2 in a second fluid path 113. The CO2 from the first fluid path 111 enters a cooling gas inlet 107 of the gas turbine 102, cools components of the gas turbine engine 102, and exits a cooling gas outlet 109 of the gas turbine 102 at a higher temperature (e.g., 1,100° F.). The CO2 is expanded in an expander 114 that lowers the temperature of the CO2 (e.g., 650° F.). The CO2 from the expander 114 is routed to the heat exchanger 112 where the CO2 enters the second fluid path 113, and heats the CO2 in the first fluid path 111. The CO2 exits the second fluid path 113 of the heat exchanger 112 and is routed to the compressor 108 inlet. The illustrated exemplary embodiment uses a gas turbine engine 102, however other similar systems may use another type of engine that outputs an exhaust, and is cooled by CO2.

Figure 2:
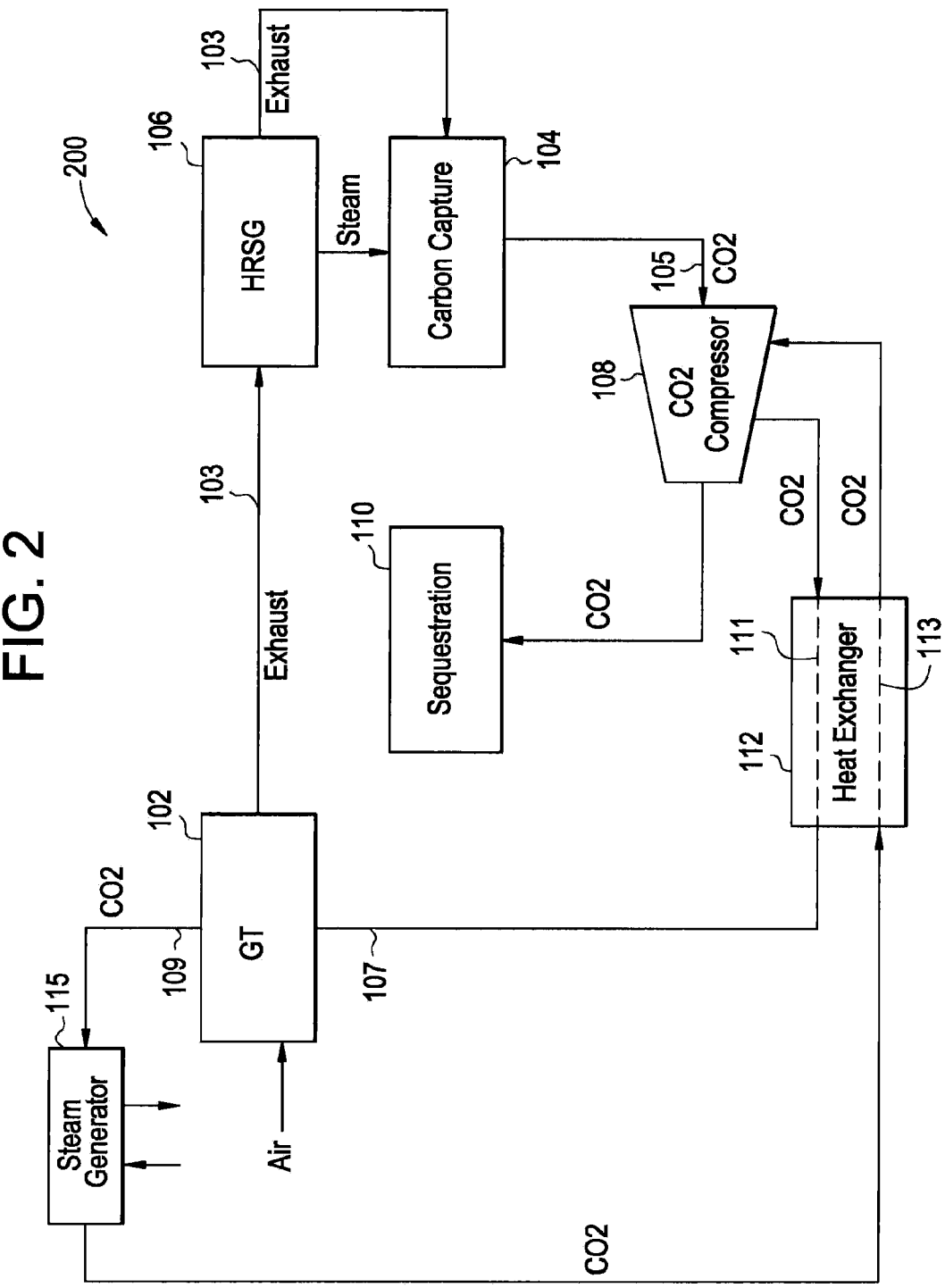
FIG. 2 illustrates an exemplary alternate embodiment of a system and method for power generation.

FIG. 2 illustrates an alternate embodiment of a system 200. The system 200 operates in a similar manner as the system 100 described above. In the system 200, the CO2 expander 114 is replaced by a steam generator 115 that may be for example, a kettle reboiler, in which the heat extracted from the hot CO2 returning from the gas turbine 102 is utilized to generate steam at a suitable pressure. The steam that is generated in the steam generator 115 may be for example, admitted to a combined cycle steam turbine (not shown) or utilized in a separate steam turbine for additional power generation.

Figure 3:
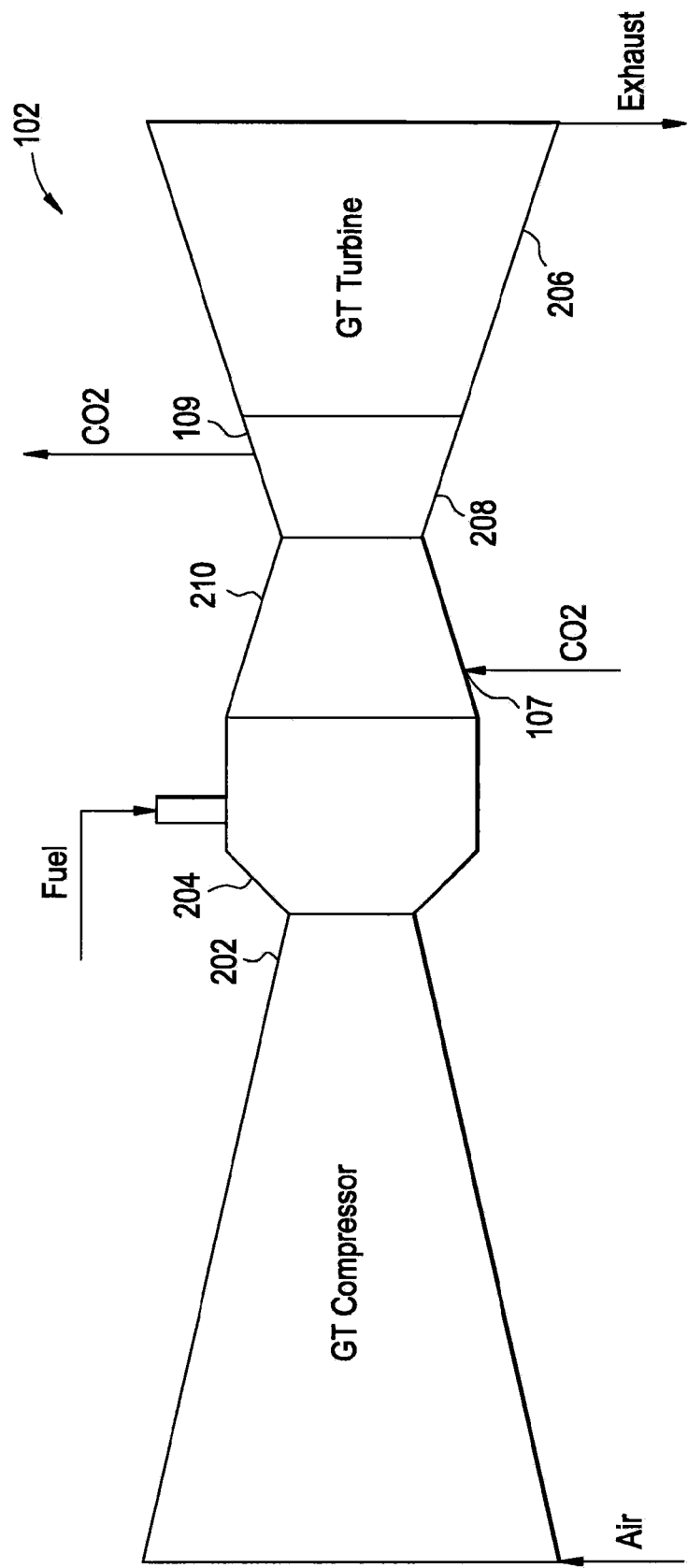
FIG. 3 illustrates block diagram of an exemplary embodiment of the engine of FIG. 1 and FIG. 2.

FIG. 3 illustrates block diagram of an exemplary embodiment of the gas turbine 102. The gas turbine 102 includes a compressor portion 202, a combustor portion 204 operative to combust fuel, and a power turbine portion 206. The CO2 enters the cooling gas inlet 107, cools engine components such as, for example, hot gas path (HGP) components, such as, the first turbine stage stators (nozzles) 208, or the combustor transition piece 210, and exits the engine via the cooling gas outlet 109.

The use of CO2 in a closed loop to cool the HGP components of the gas turbine 102 increases the power output and efficiency of the gas turbine 102. CO2 has better heat transfer properties over compressed air, i.e., higher specific heat, in order to achieve the cooling of the HGP components of the gas turbine 102 with a smaller amount of coolant flow. The use of CO2 as a turbine coolant to replace the bleed air from the compressor allows more compressed air to be used for combustion and turbine expansion for useful shaft power generation. Bleed air from the compressor typically enters the gas flow path and mixes with the hot combustion gases upstream of the first stage rotor inlet, where it starts useful work generation via expansion. The use of CO2 as described above, avoids the undesirable lowering of the turbine inlet temperatures by mixing with bleed air and reduces temperature differences between the turbine inlet and the rotor inlet (firing temperature) of the gas turbine 102. The increased efficiency and power output of the gas turbine 102 when cooled by CO2 offsets a portion of the inefficiencies induced in the system 100 by the CCS process. Thus, the increased gas turbine power output offsets a portion of the total CCS power loss that includes the lost steam turbine power output due to the thermal energy used to capture the CO2 from the exhaust gases, and the parasitic power consumption used to compress the captured CO2 for sequestration.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for power generation comprising:
an engine operative to output an exhaust gas;
a carbon capture means operative to remove carbon dioxide (CO2) from the exhaust gas and output the CO2; and
a compressor operative to receive the CO2 and output compressed CO2 that cools a component of the engine2 and
a heat exchanger having a first fluid path and a second fluid path, operative to receive the compressed CO2 output from the compressor in the first fluid path and output the CO2 at a higher temperature from the first fluid path to a cooling gas inlet of the component of the engine.

2. The system of claim 1, wherein the system further comprises an expander operative to receive CO2 from a cooling gas outlet of the engine, and output expanded CO2 at a lower temperature to the second fluid path of the heat exchanger.

3. The system of claim 1, wherein the system further comprises a steam generator operative to receive CO2 from a cooling gas outlet of the engine, and output expanded CO2 at a lower temperature to the second fluid path of the heat exchanger.

4. The system of claim 1, wherein the carbon capture means is an amine-based system.

5. The system of claim 1, wherein the heat exchanger is further operative to output CO2 from the second fluid path to the compressor.

6. The system of claim 1, wherein the system further comprises a heat recovery steam generator operative to receive the exhaust gas from the engine, cool the exhaust gas, and output the cooled exhaust gas to the carbon capture means.

7. The system of claim 1, wherein the system further comprises a carbon sequestration location operative to receive and store a portion of the compressed CO2 output from the compressor.

8. The system of claim 1, wherein the component of the engine is a turbine hot gas path component downstream from a portion of a combustor.

9. A method for operating a power system comprising:
outputting exhaust gas from an engine;
removing carbon dioxide (CO2) from the exhaust gas;
compressing the CO2; and
cooling a component of the engine with the compressed CO2 without intermixing the compressed CO2 with any fluid from the engine.

10. The method of claim 9, wherein the method further comprises heating the compressed CO2 prior to cooling the component of the engine with the CO2.

11. The method of claim 9, wherein the method further comprises expanding CO2 that cooled the component of the engine.

12. The method of claim 9, wherein the method further comprises generating steam with the CO2 that cooled the component of the engine.

13. The method of claim 11, wherein the compressed CO2 is heated with CO2 that cooled the component of the engine.

14. The method of claim 9, wherein a portion of the compressed CO2 is stored in a sequestration location.

15. The method of claim 9, wherein the CO2 is removed from the exhaust gas with a carbon capture means.

16. The method of claim 9, wherein the engine is a gas turbine engine.

17. The method of claim 9, wherein the carbon capture means is an amine-based system.

18. The method of claim 9, wherein the CO2 that cooled the component of the engine exits the engine via a cooling gas outlet.

* * * * *